2,706,441
Patented Apr. 19, 1955

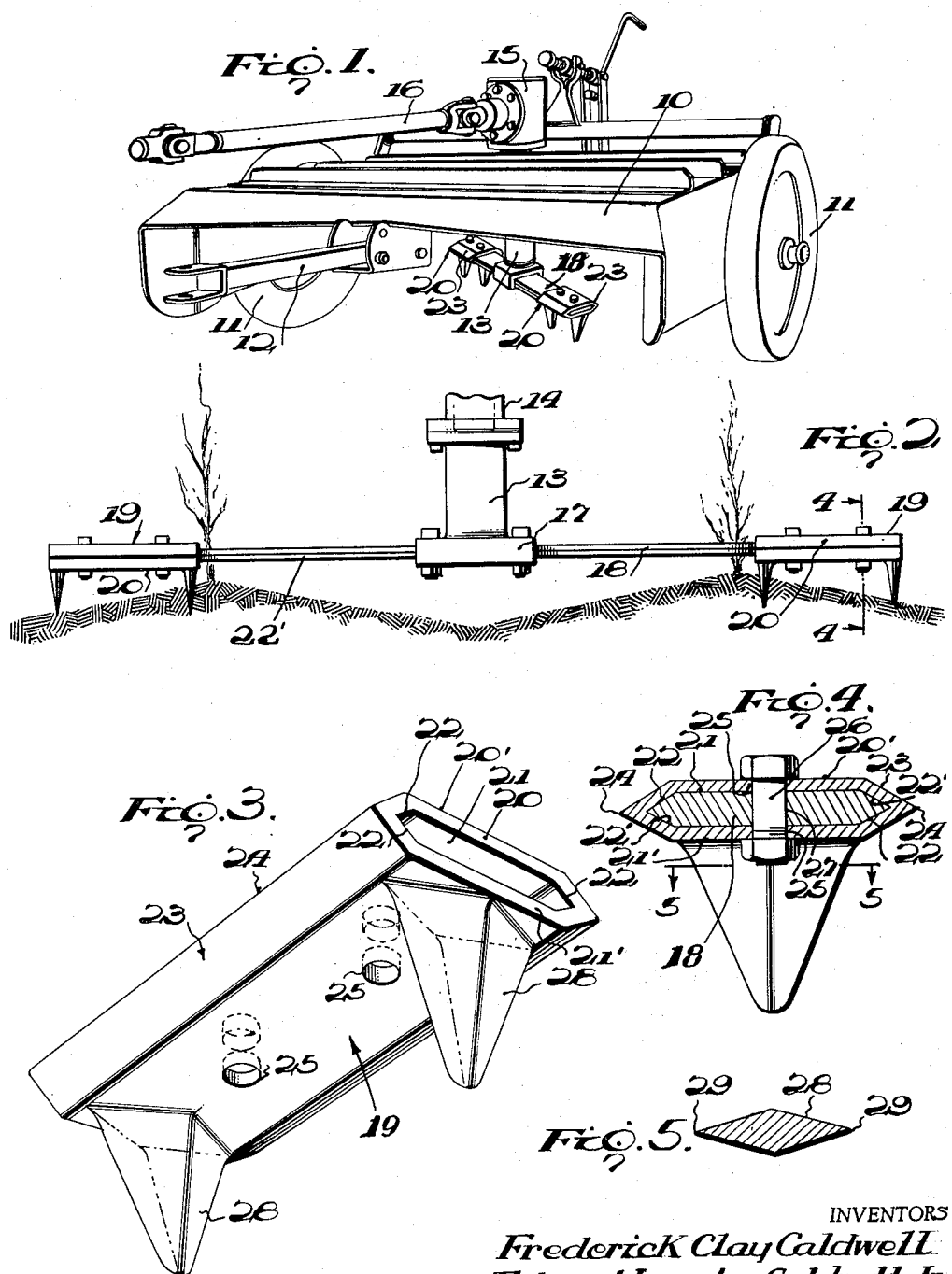

2,706,441

ATTACHMENT FOR ROTARY STALK CUTTER

Frederick Clay Caldwell and Edward Lasater Caldwell, Jr., Corpus Christi, Tex., assignors to E. L. Caldwell & Sons, Corpus Christi, Tex., a firm Application April 13, 1953, Serial No. 348,326

4 Claims. (Cl. 97—212)

Our invention relates to cutting attaching means for a rotary blade of a stalk or brush cutting machine.

An important object of the invention is to provide a device of the above mentioned character which may be applied to a rotary blade and which will serve to pick up from the ground, stalks or brushes that are lying down, and then cut the same into short lengths.

A further object of the invention is to provide a device of the above mentioned character which will serve as a rotary harrow or digger to cultivate or mulch the ground.

A further object of the invention is to provide a device of the above mentioned character which may be constructed to fit a standard rotary blade and which may be secured thereto in a simple and reliable manner.

Other objects and advantages of the invention will be apparent during the course of the following description.

In the accompanying drawings forming a part of this application and in which like numerals are employed to designate like parts throughout the same, Figure 1 is a perspective view of cutting attaching devices embodying our invention and applied to a standard rotary blade, Figure 2 is a side elevation of the same, Figure 3 is a perspective view of one of the cutting attaching devices, removed, Figure 4 is a vertical section taken on line 4—4 of Fig. 2, and Figure 5 is a horizontal section taken on line 5—5 of Figure 4.

In the drawings, numeral 10 designates the casing or housing of a machine for cutting stalks or brushes. This casing is suitably supported by wheels 11. The casing 10 is moved longitudinally of the rows by a draft appliance 12, to be secured to a tractor. The rotary cutting unit of the machine comprises a collar 13, vertically arranged and suitably mounted upon the casing or housing 10. This collar rotates about a vertical axis and is connected with a vertical shaft 14, driven by a gearing within the housing 15. This gearing is driven by a shaft 16 leading to the power take-off of the tractor. The collar 13 has a horizontal socket 17 integral therewith, and this socket receives a horizontal blade 18, clamped within the socket 17. The blade extends for equal distances upon opposite ends of the socket.

The foregoing construction is that of a rotary cutting machine, in connection with which our improved cutting attaching devices are used. The cutting attaching devices are designated by the numeral 19. Each cutting attaching device 19 comprises an elongated horizontal socket, sleeve or casing 20, for receiving the outer end of the horizontal rotary blade 18. The casing sleeve or socket 20 is tubular and has a flat top 20' and a flat bottom 21' and a bore 21, having tapered or converging edges 22, for receiving the tapered or sharpened edges 22' of the blade 18. This blade is equipped with tapered or sharpened edges 22' at both sides, near its outer ends, and may be so equipped throughout its entire length, if desired. The outer longitudinal edges 23 of the socket sleeve or casing 20 is tapered or beveled providing sharp cutting edges 24. Each casing or socket 20 is provided in its top and bottom with openings 25, reeciving bolts 26, passing through openings 27, formed in the blade 18. The socket, sleeve or casing has its opposite ends open and may therefore be reversibly mounted upon the blade 18.

Formed integral with the bottom of the casing 20, at its ends, are vertical blades 28, which taper downwardly. These vertical blades also taper horizontally toward their longitudinal edges, forming sharp cutting edges 29. The blades 28 are diamond-shaped in horizontal cross-section. The edges 29 of each blade 28 converge downwardly.

In operation, when the machine is moved longitudinally of the rows, the blade 18 is horizontally rotated and serves to cut the stalks or brushes. The cutting attaching devices 19 being rigidly mounted upon the opposite ends of the blade 18 rotate horizontally with this blade. The sharp edges 24 serve to cut the stalks or brushes. The vertical blades 28 extend to the ground and may penetrate the ground or hill for some distance. The vertical blades 28 serve to pick up stalks or brushes which are more or less horizontally arranged upon the ground, whereby such stalks or brushes are cut into short lengths and will then fall upon the ground. Since the blades 28 penetrate the ground or hills for a considerable distance, they serve to cultivate or mulch the ground.

It is thus seen that we have provided cutting attaching devices which may be quickly and conveniently applied to a horizontal rotary blade made in a selected size. The devices are of simple construction.

It is to be understood that the form of our invention herewith shown and described is to be taken as a preferred example of the same and that various changes in the shape, size, and arrangement of parts may be resorted to without departing from the spirit of our invention or the scope of the subjoined claims.

It is to be further noted that the casings 20 are interchangeable. Each casing is removably mounted upon the blade 18 and is reversible upon the blade 18 so that either cutting edge 24 may be arranged at the leading edge of the blade 18. This enables both edges 24 being used, and both edges 29 being used.

Having thus described our invention, we claim:

1. A cutting attaching device, comprising a sleeve to be mounted upon a horizontal rotary blade and having its opposite ends open, said sleeve having its opposite longitudinal edges provided with cutting edges, substantially vertical blades arranged beneath the sleeve and formed integral therewith, said blades being arranged adjacent to the opposite ends of the sleeve, each blade tapering downwardly and provided with opposed cutting edges, the sleeve being reversibly mounted upon the blade so that either longitudinal cutting edge of the sleeve may be arranged at the leading edge of the blade, and means to secure the sleeve upon the blade.

2. A cutting attaching device for the rotary blade of a stalk or brush cutting machine, said device comprising a sleeve having its opposite ends open so that the sleeve may be reversibly mounted upon the rotary blade, said sleeve having opposed cutting edges, generally vertical blades secured to said sleeve near its opposite ends, each generally vertical blade having opposed cutting edges, and means to hold the sleeve in place upon said blade.

3. A cutting attaching device for the rotary blade of a stalk or brush cutting machine, said device comprising a sleeve having its opposite ends open so that said sleeve may be reversibly mounted upon said blade, said sleeve having opposed cutting edges, and a generally vertical blade secured to said sleeve and having opposed cutting edges.

4. A cutting attaching device for the rotary blade of a stalk or brush cutting machine, said device comprising an elongated sleeve having its opposite ends open so that the sleeve may be reversibly mounted upon said blade, said sleeve being provided with opposed cutting edges extending longitudinally of the same, and generally vertical blades carried by the elongated sleeve, each blade being longitudinally tapered toward its outer end and having opposed cutting edges, and means to hold the sleeve in place upon said rotary blade.

References Cited in the file of this patent

UNITED STATES PATENTS

| | | |
|---|---|---|
| 952,826 | Ludwick | Mar. 22, 1910 |
| 1,021,573 | Carawan | Mar. 26, 1912 |
| 1,778,346 | Zeidler | Oct. 14, 1930 |
| 2,477,442 | Cramer et al. | July 26, 1949 |
| 2,571,455 | Keiper | Oct. 16, 1951 |
| 2,651,159 | Roundtree | Sept. 8, 1953 |